US010783231B2

(12) United States Patent
Chakraborty et al.

(10) Patent No.: US 10,783,231 B2
(45) Date of Patent: *Sep. 22, 2020

(54) DISTRIBUTED TRUST AS SECONDARY AUTHENTICATION MECHANISM

(71) Applicant: Bank of America Corporation, Charlotte, NC (US)

(72) Inventors: Pinak Chakraborty, Hyderabad (IN); Nagasubramanya Lakshminarayana, Hyderabad (IN); Harigopal K. B. Ponnapalli, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/295,157

(22) Filed: Mar. 7, 2019

(65) Prior Publication Data
US 2019/0205520 A1 Jul. 4, 2019

Related U.S. Application Data

(63) Continuation of application No. 15/277,590, filed on Sep. 27, 2016, now Pat. No. 10,275,590.

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/40* | (2013.01) |

(52) U.S. Cl.
CPC .................................. *G06F 21/40* (2013.01)

(58) Field of Classification Search
CPC ........... G06F 21/30; G06F 21/31; G06F 21/40
See application file for complete search history.

(56) References Cited

U.S. PATENT DOCUMENTS

| | | |
|---|---|---|
| 6,688,520 B2 | 2/2004 | Maruyama |
| 6,920,559 B1 | 7/2005 | Nessett et al. |

(Continued)

OTHER PUBLICATIONS

Brainard, John et al., "Fourth-Factor Authentication: Somebody You Know," CCS '06, Oct. 30-Nov. 3, 2006, Alexandria, VA.

*Primary Examiner* — Trong H Nguyen
*Assistant Examiner* — Amie C. Lin
(74) *Attorney, Agent, or Firm* — Banner & Witcoff, Ltd.; Michael A. Springs

(57) ABSTRACT

A computer system supports secondary authentication mechanism for authentication of a user, where the computer system may provide a variety of services including financial, scientific, academic, or governmental services. The computer system utilizes a multiphase distributed trust model in which the user is authenticated based on distributed trust of a set of randomly selected trusted contacts from a large set of trusted contacts initially chosen during an enrollment phase. During the authentication phase, a subset of contacts (affirmers) is selected from the contact list. The computer system then provides additional authentication information to each of the affirmers who subsequently share the information with the user. The user then provides this information from the computer system in order to complete the secondary authentication.

21 Claims, 10 Drawing Sheets

(56) References Cited

U.S. PATENT DOCUMENTS

| | | | |
|---|---|---|---|
| 7,093,291 B2 | 8/2006 | Bailey | |
| 7,174,454 B2 | 2/2007 | Roskind | |
| 7,480,939 B1 | 1/2009 | Nessett et al. | |
| 7,747,867 B2 | 6/2010 | Yim et al. | |
| 7,849,307 B2 | 12/2010 | Roskind | |
| 8,079,070 B2 | 12/2011 | Camaisa et al. | |
| 8,181,015 B2 | 5/2012 | Roskind | |
| 8,230,487 B2 | 7/2012 | Feil | |
| 8,238,616 B2 | 8/2012 | Muquit et al. | |
| 8,336,091 B2 | 12/2012 | Wong | |
| 8,352,329 B2 | 1/2013 | Ryu et al. | |
| 8,365,258 B2 | 1/2013 | Dispensa | |
| 8,443,206 B2 | 5/2013 | Lee et al. | |
| 8,473,748 B2 | 6/2013 | Sampas | |
| 8,522,324 B2 | 8/2013 | Feil | |
| 8,612,747 B2 | 12/2013 | Roskind | |
| 8,793,490 B1 | 7/2014 | Szwalbenest | |
| 8,806,599 B2 | 8/2014 | Roy | |
| 8,819,851 B1 | 8/2014 | Johansson | |
| 8,832,788 B1* | 9/2014 | Gibson | G06F 21/40 713/155 |
| 8,914,848 B2 | 12/2014 | Castro et al. | |
| 8,930,655 B2 | 1/2015 | Abzarian et al. | |
| 8,954,730 B2 | 2/2015 | Roskind | |
| 9,043,887 B2 | 5/2015 | McLachlan et al. | |
| 9,147,061 B1 | 9/2015 | McClendon et al. | |
| 9,177,716 B2 | 11/2015 | Goto | |
| 9,240,012 B1 | 1/2016 | Szwalbenest | |
| 9,240,887 B2 | 1/2016 | Hamlin et al. | |
| 9,324,098 B1 | 4/2016 | Agrawal et al. | |
| 9,390,288 B2 | 7/2016 | Gryb et al. | |
| 9,396,316 B1 | 7/2016 | Altman | |
| 9,397,996 B2 | 7/2016 | Roskind | |
| 9,419,956 B2 | 8/2016 | Abraham et al. | |
| 9,436,400 B2 | 9/2016 | Abzarian et al. | |
| 9,438,604 B1* | 9/2016 | Addala | H04L 63/105 |
| 2011/0239278 A1* | 9/2011 | Downey | G06F 21/34 726/4 |
| 2011/0270751 A1* | 11/2011 | Csinger | H04L 63/18 705/42 |
| 2014/0150072 A1* | 5/2014 | Castro | H04L 63/104 726/5 |
| 2014/0282870 A1* | 9/2014 | Markwordt | H04L 63/08 726/3 |
| 2018/0054733 A1* | 2/2018 | Houseworth | G06F 21/32 |

\* cited by examiner

Please find the list of social contacts who have been sent the verification code Affirmer 1 — 901
Affirmer 2 — 902
Affirmer 3 — 903

DISTRIBUTED TRUST AS SECONDARY AUTHENTICATION MECHANISM

PRIORITY

This application is a continuation of U.S. patent application Ser. No. 15/277,590 entitled "Distributed Trust as Secondary Authentication Mechanism" and filed on Sep. 27, 2016 which is incorporated by reference herein in its entirety.

FIELD

Aspects described herein relate to computer security. More specifically, aspects described herein provide a mechanism for secondary authentication of a user in a computer system.

BACKGROUND

Access to a computer system (e.g., one or more business functionalities) often require a user to be positively identified using a secondary authentication mechanism such as "Challenge Questions", when the primary authentication mechanism (e.g., password, biometrics) is blocked. The "Forgot Password" feature is one such example.

The secondary authentication mechanism that is typically deployed in traditional computer systems has a number of deficiencies. First, the set of challenge questions is typically static, very limited, and applicable to all users, all of which reduce the degree of randomness of the questions. Second, the challenge questions are often related to personal data and hence, a persistent malicious user can gather the required information to be able to answer these questions by researching on social media or using social engineering. Also, the set of questions, if compromised in one system for a user, can make other systems vulnerable for similar kind of attack for that user, where an answer to the question on first system remains the same across different systems for a user. An alternative traditional approach requires a user to visit or call a designated facility, which is typically cumbersome and time consuming for the user.

BRIEF SUMMARY

Aspects described herein address one or more of the issues mentioned above by disclosing methods, computer readable media, and apparatuses that support secondary authentication based on distributed trust for a set of other trusted users. The approach reduces the probability of success for a malicious user gaining access to a computer system by distributing trust and thus reducing points of vulnerability. Consequently, even in the context of a Byzantine Generals problem, introducing randomness in selection of the nodes that authenticate a user prevents a group of users with malicious intent to compromise the authentication mechanism.

According to another aspect, the authentication process consists of multiple phases, where the enrollment phase is performed before the authentication phase. During the enrollment phase, a set of n trusted contacts are identified for the user. The user is typically acquainted with trusted contacts so that the set may be obtained from the user's social media profile and/or contact list on the device on which a system application is installed. The computer system may obtain entries in the contact list and then match the contact list with the system's database of known users.

According to another aspect, a set of r users (affirmers) may be selected from the user's list of n trusted contacts. When the user attempts to complete secondary authentication, the computer system sends a token to each of the affirmers with a random sequence or one-time password (OTP). Each affirmer shares the information with the user so that the user can provide said information to the complete secondary authentication.

According to another aspect, parameters n and r may be determined in order to achieve a desired level of security in relation to compromising secondary authentication.

Aspects described herein may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which:

FIG. 9 shows a screenshot that may be displayed at a user's device in accordance with one or more illustrative aspects described herein.

DETAILED DESCRIPTION

In accordance with various aspects of the embodiments, methods, computer-readable media, and apparatuses are disclosed for secondary authentication based on distributed trust of a set of other trusted users. Such an approach provides significant advantages over traditional computer systems by eliminating the dependency on a set of static questions based on personal data. Moreover, with respect to traditional computer systems, the approach reduces the probability of success for a malicious user gaining access to the computer system even in the context of a Byzantine Generals problem by introducing randomness in selection of the nodes that authenticate a user so that a group of users with malicious intent will find it nearly impossible to compromise the authentication mechanism.

Figure 1:
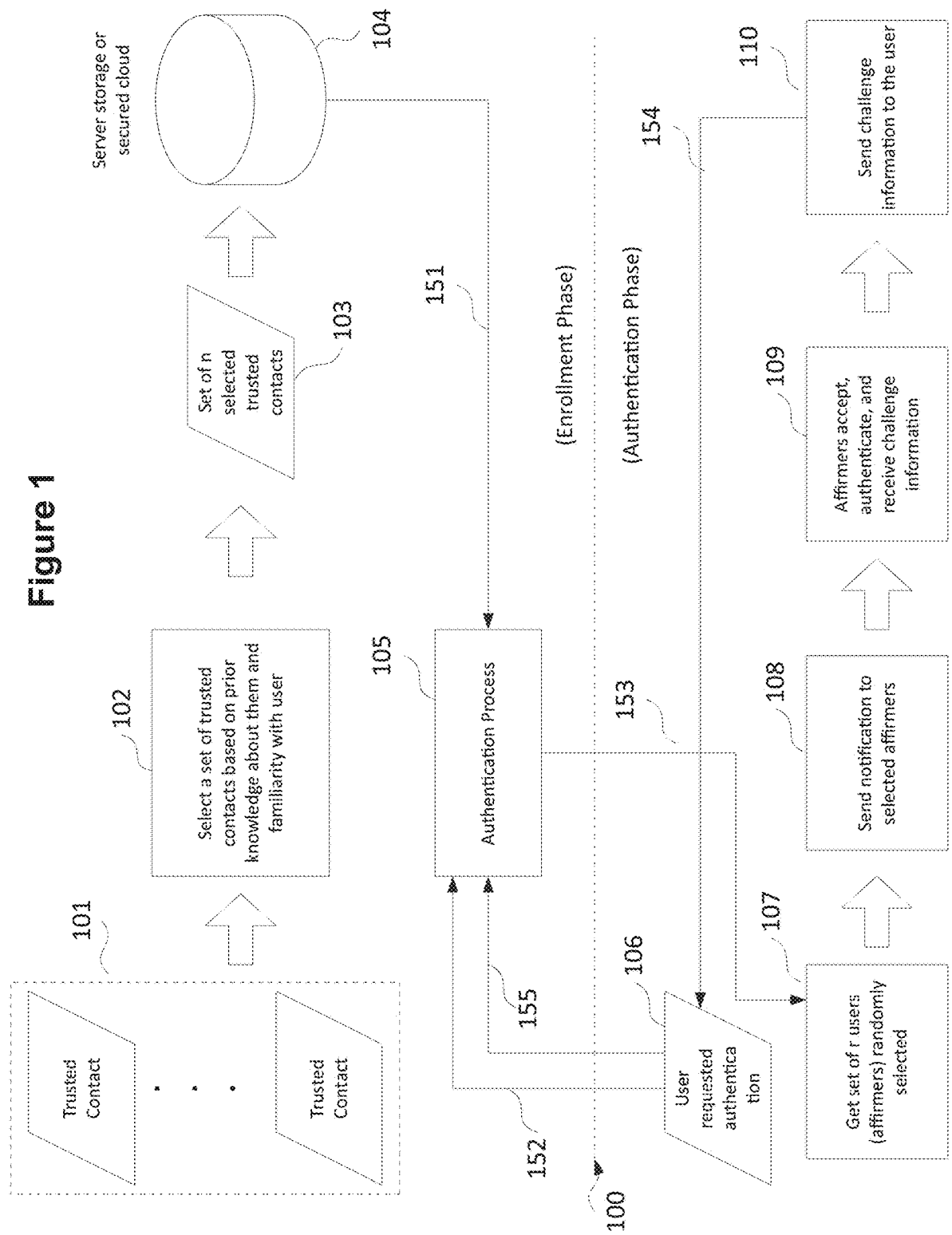
FIG. 1 shows a system that supports secondary authentication in accordance with one or more illustrative aspects described herein.

FIG. 1 shows computer system 100 that supports secondary authentication of a user in accordance with an aspect of the embodiments. Computer system 100 may support a variety of services including financial, scientific, academic, or governmental services. Computer system 100 supports a multiphase distributed trust model in which a user is authenticated based on distributed trust of a set of randomly selected trusted contacts (which may be selected users of computer system 100) selected from a large set of trusted contacts initially chosen by computer system 100 and/or the user during the enrollment phase. Some embodiments may require the trusted contacts as being other users of computer system 100 while some embodiments may not impose this restriction.

The secondary authentication mechanism is often centralized in a computer system. Computer system 100 additionally supports distributed trust in a random fashion for a secondary authentication mechanism. Moreover, as will be discussed, the probability of a compromised authentication may be reduced to an insignificant value by distributing trusts in different nodes.

As will be discussed, this approach reduces the probability of computer system 100 being compromised even in case of a Byzantine Generals problem to a significant extent by introducing randomness in the authentication mechanism and requiring all of the selected trusted contacts to agree. (The Byzantine Generals problem is based on a hypothetical story in which a group of generals, each commanding a portion of the Byzantine army, encircle a city. The generals wish to formulate a plan for attacking the city. In its simplest form, the generals must only decide whether to attack or retreat. Some generals may prefer to attack, while others prefer to retreat. The pertinent aspect is that every general agrees on a common decision, for a halfhearted attack by a few generals would become a rout and be worse than a coordinated attack or a coordinated retreat.)

The authentication process depicted in FIG. 1 consists of multiple phases, where the enrollment phase is performed before the authentication phase.

At block 101, a user registers contact details (phone/email) of a set other users of system 100 whom the user has acquaintance with, and who can affirm the user when the system requires it. With some embodiments, the set of other users are already be trusted by the system since the other users have been previously verified by computer system 100.

Computer system 100 may auto discover and provide suggestions to the user during enrollment who are potential acquaintances of the user from which the user can select a subset of them at block 102. The suggestions may be based on the user's social media profile, or a contact list on the device on which a system application is installed that can read into the contact list. Computer system 100 can then match this contact list with the system database of known users.

Alternatively, the user can directly enter the details of the user's acquaintances from which computer system 100 can validate the entered information.

Figure 5A:
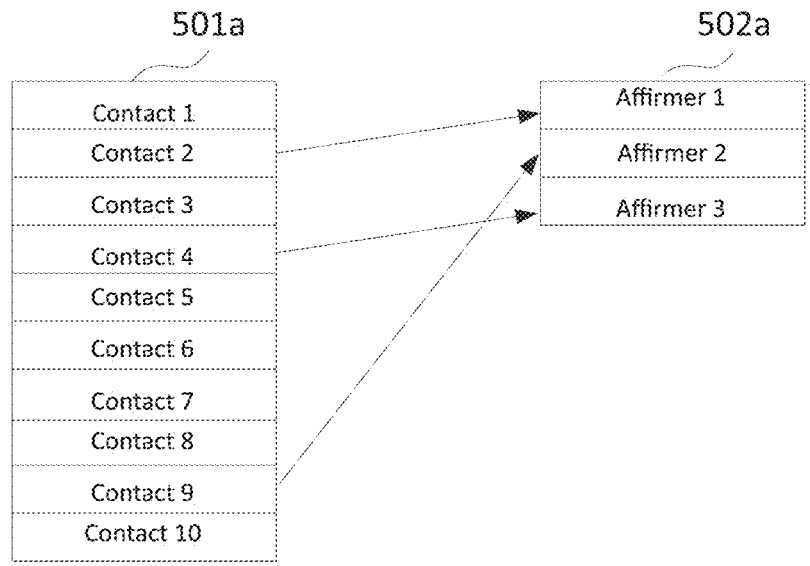
FIGS. 5A-B shows instances for obtaining an affirmer list from a trusted contact list for a user in accordance with one or more illustrative aspects described herein.
Figure 5B:
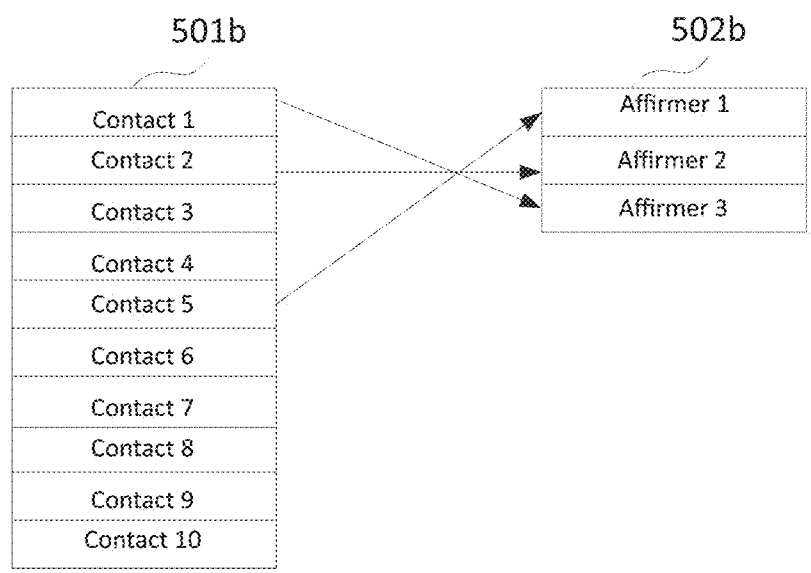

Based on the selected users, computer system 100 forms the set of trusted contacts (corresponding to list 501a,b as shown in FIGS. 5A-B) at block 103. Each entry in the list identifies a trusted contact as well as contact information about reaching the trusted contact. At block 104, the list of trusted contacts for each user is subsequently stored at a storage device, which may be internal or external (e.g., in the "cloud") to computer system 100 for subsequent access during the authentication phase. At block 105, the list may be accessed from the storage device by the authentication process via communication channel 151, which is typically secure. The user is then enrolled (registered) for the secondary authentication feature.

With an aspect, computer system 100 selects trusted contacts for list 501a in a uniformly distributed manner. For example, a trusted contact ("Jill") may be an acquaintance of several users (including "Jack"). However, system 100 may select "Jill" only for the contact list of Jack so that if Jill's computer were hacked, only one user ("Jack") is affected. Moreover, computer system 100 may prevent reciprocity so that Jack is not included in Jill's contact list.

During the authentication phase, a user may be authenticated by a primary authentication mechanism (e.g., by entering the user's password). However, the user may have forgotten the password or may chose not to enter it. In such a situation, the user is required to identify (authenticate) himself/herself to computer system 100 at block 106 through secondary authentication via communication channel 152. With some embodiments, communication channel 152 to system 100 is a secure channel to a website providing services to the user.

Computer system 100 selects a random set of r users (which may be referred as "affirmers") from the registered contact list of n users at block 107 via communication channel 153, and sends notifications to the r users at block 108 asking whether they can identify the user being authenticated.

Figure 2:
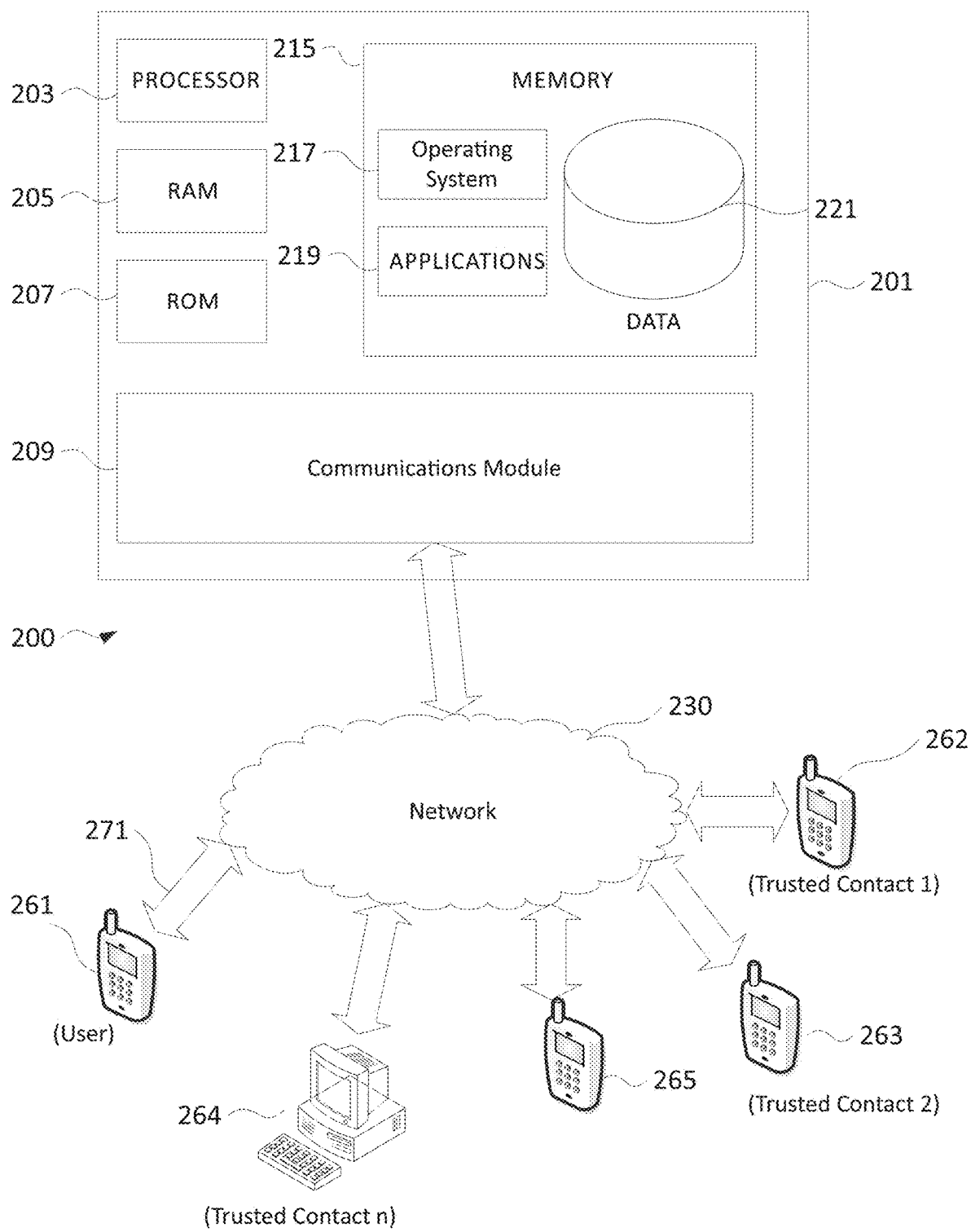
FIG. 2 shows an illustrative operating environment in accordance with one or more illustrative aspects described herein.

With some embodiments, in order to provide a better user experience, computer system 100 notifies each of the selected r users about affirming the user through a mobile app executing on the affirmer's wireless device (e.g., device 262 as shown in FIG. 2) through a secure channel. With some embodiments, if the mobile app is not already executing on the affirmer's wireless device, computer system 100 may inform the affirmer to log into computer system 100 or may initiate the launching of the mobile app.

If all r users do not accept, then the system 100 randomly selects the remaining set of users to be able to reach the set of r users who can affirm the user.

All r acquaintances who have agreed to authenticate the user authenticate themselves to system 100 may use primary means of authentication at block 109. For example, each affirmer enters the affirmer's user name and password through secure channel 153.

Upon successful authentication of all r acquaintances, computer system 100 sends different random challenge information (e.g., an authentication token that includes a random string, one-time password (OTP), random text, random number, and so forth) to each of them at block 110.

After receiving the authentication token, the authenticated acquaintances (affirmers) share the received challenge information (e.g., the random string or OTP contained in the token) with the user through communication channel 154. The affirmers may share the received challenge though various means, which may be independent of computer system 100. Communication channel 154 may assume different forms and is often consistent with ways the user and affirmers typically communicate in other situations that are independent from system 100. For example, an affirmer may provide challenge information to the user via e-mail, texting, telephone call, and so forth.

When the user has received the challenge information from all of the affirmers, the user enters the shared challenge information via communication channel 152 to complete the authentication process. If the entered information is the same with what computer system 100 previously sent to the affirmers (the selected r users), system 100 grants authentication.

With some embodiments, a minimum number of affirmers (equal to r) is required to achieve an acceptable risk based on the probability of a compromise. For example, EQ. 5, as will be discussed, provides a modeling for the probability of a compromise. With such an approach, system 100 may request more than r users to affirm, but will authenticate a user when challenge information (secondary authentication information) from at least the minimum of number of affirmers is entered correctly by the user.

The value of r (i.e., the number of trusted users randomly selected) typically depends on user convenience versus the level of security. A greater value of r provides an increased degree of authentication with more trusted contacts. However, the user must enter more input for authentication, which may cause secondary authentication to be more burdensome for the user.

With some embodiments, the value of r may be varied based on the user and/or the perceived vulnerability of computer system 100. For example, computer system 100 may change the value of r based on the detected number of attacks on the system. As another example, the value of r may be different for different users based on the user's account balance when computer system 100 provides financial services.

With some embodiments, if the user is unable to successfully complete secondary authentication, the user may contact a person that is associated with system 100 via communication channel 155, which is independent from system 100.

Figure 3:
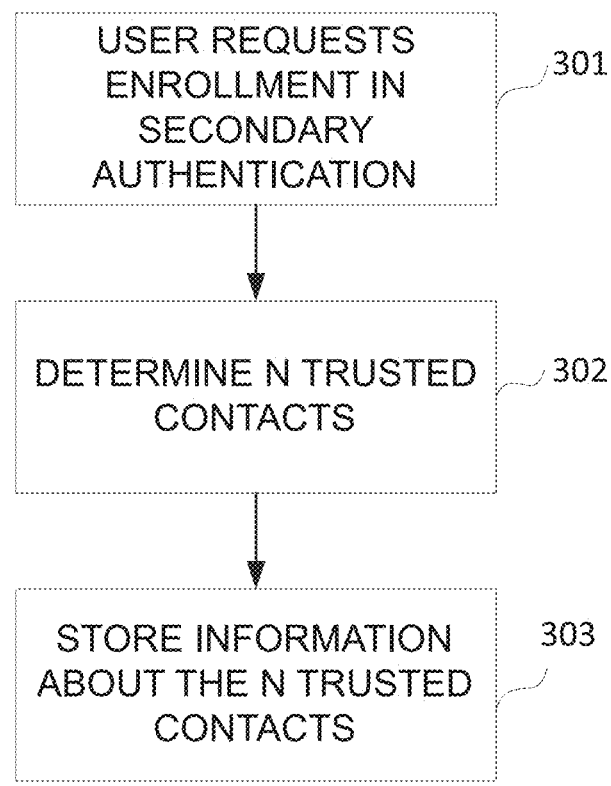
FIG. 3 shows a flow chart for an enrollment phase of secondary authentication in accordance with one or more illustrative aspects described herein.
Figure 4:
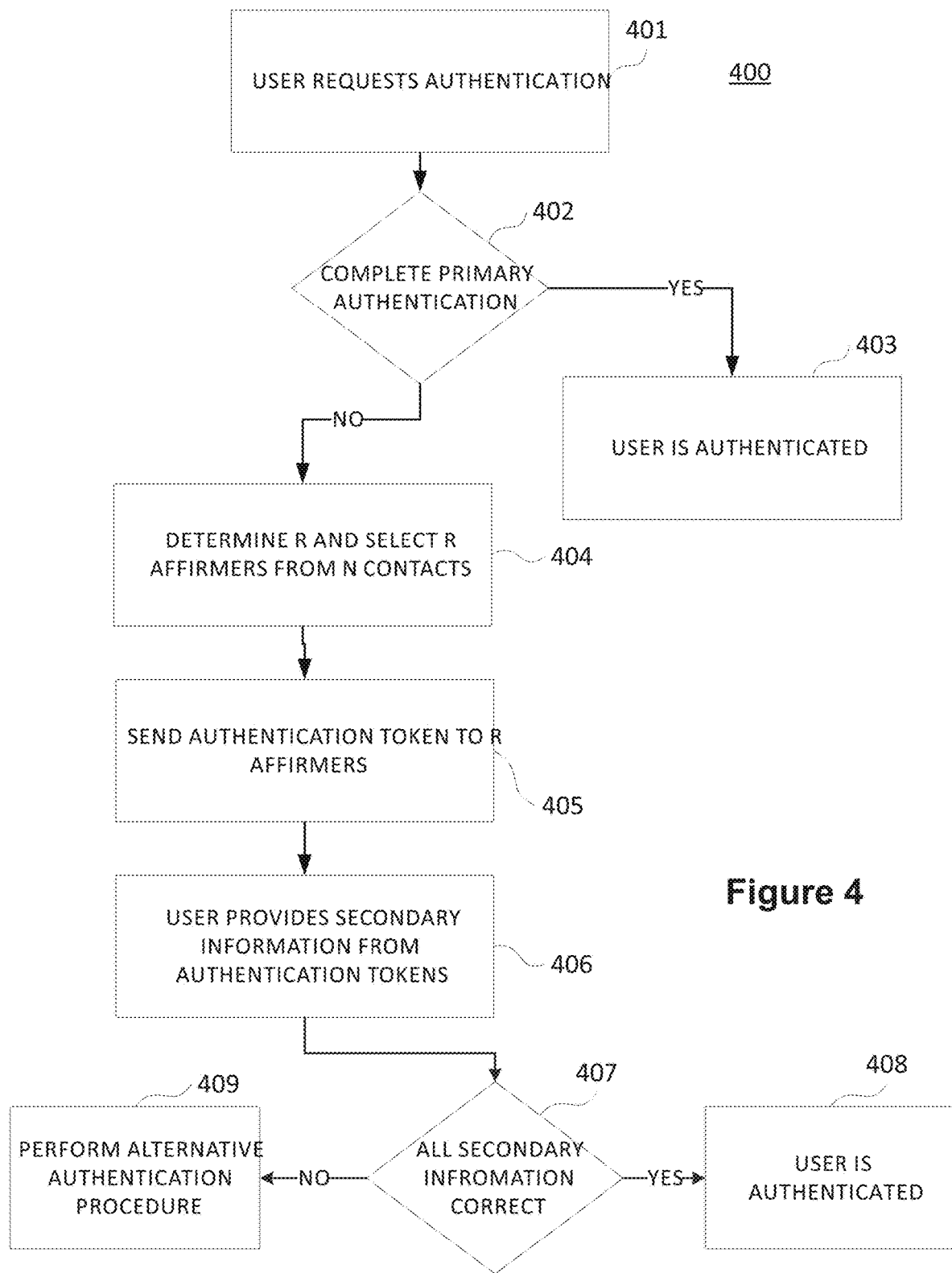
FIG. 4 shows a flow chart for an authentication phase of secondary authentication in accordance with one or more illustrative aspects described herein.

FIG. 2 illustrates an example of a suitable computing system environment 100 that may be used according to one or more illustrative embodiments for implementing any of the computing devices in FIG. 1, performing processes 300 and 400 as shown in FIGS. 3-4, respectively. Computing system environment 200 is only one example of a suitable computing environment and is not intended to suggest any limitation as to the scope of use or functionality of the invention. The computing system environment 200 should not be interpreted as having any dependency or requirement relating to any one or combination of components shown in the illustrative computing system environment 200.

Computing system environment 200 may include a computing device 201 wherein the processes discussed herein may be implemented. The computing device 201 may have a processor 203 for controlling overall operation of the computing device 201 and its associated components, including RAM 205, ROM 207, communications module 209, and memory 215. Computing device 201 typically includes a variety of computer readable media. Computer readable media may be any available media that may be accessed by computing device 201 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 201.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 205 may include one or more are applications representing the application data stored in RAM memory 205 while the computing device is on and corresponding software applications (e.g., software tasks), are running on the computing device 201.

Communications module 209 may include a microphone, keypad, touch screen, and/or stylus through which a user of computing device 201 may provide input, and may also include one or more of a speaker for providing audio output and a video display device for providing textual, audiovisual and/or graphical output.

Computer-executable instructions may be stored within memory 215 and/or storage to provide instructions to processor 203 for enabling computing device 201 to perform various functions. For example, memory 215 may store computer-executable used by the computing device 201, such as an operating system 217, application programs 219, and an associated database 221. Alternatively, some or all of the computer executable instructions for computing device 201 may be embodied in hardware or firmware (not shown). Database 221, for example, may provide centralized storage of lists of trusted contacts for the secondary authentication of different users. For example, computer devices 262-264 are registered to trusted contacts for a given user (associated with wireless device 261). While computer device 265 may be registered to another user, the other user is not a trusted contact for the given user in this example.

Additionally, one or more application programs 219 used by the computing device 201, according to an illustrative embodiment, may include computer executable instructions for executing authentication processes. Computer device 201 communicates with wireless devices 261-265 over secure communications channels through communications module 209, wireless carrier channels 271, and network 230 to perform the authentication of a user.

Embodiments of the invention may include forms of computer-readable media. Computer-readable media include any available media that can be accessed by a computing device 201. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 201. Such a processor may execute computer-executable instructions stored on a computer-readable medium.

The steps that follow, in reference to FIGS. 3-4, may be implemented by one or more of the components in FIG. 2 and/or other components, including other computing devices.

FIG. 3 shows flow chart 300 for an enrollment phase of secondary authentication feature in accordance with an aspect of the embodiments. At block 301, the user requests to be enrolled in secondary authentication feature. The feature may serve as an authentication alternative if the user forgets his/her password when subsequently authenticated through the primary authentication mechanism. However with some embodiments, secondary authentication may be used in addition to primary authentication and/or some other secondary authentication mechanism (e.g., a static list of personal questions) to further enhance the level of security. At block 302, computer device 200, in conjunction with inputs from the user, determines the set of selected n trusted contacts (which may be other users). At block 303, computer device 200 stores the contact list into a storage device (e.g., device 221 as shown in FIG. 2) for subsequent access during the authentication phase.

FIG. 4 shows flow chart 400 for an authentication phase of secondary authentication in accordance with an aspect of the embodiments. At block 401, the user requests to authenticate in order to access computer system 100 or computer device 200. If the user is able to complete primary authentication at block 402, the user is successfully authenticated at block 403. Otherwise, process 400 completes authentication through the secondary authentication mechanism at blocks 404-408.

At block 404, computer device 200 selects r affirmers from the user's list of n contacts. Upon successful authentication of all r affirmers (acquaintances), computer system 100 sends different random challenge information (e.g., an authentication token that includes a random string, one-time password (OTP), random text, random number, and so forth) to each of the r affirmers at block 405. While not explicitly shown, the affirmers provide secondary authentication information (challenge information) from the tokens to the user via appropriate communication channels (for example communication channel 154 as shown in FIG. 1).

At block 406, the user can complete secondary authentication by providing the secondary authentication information shared by all of the r affirmers. If all of the provided information is correct, as determined at block 407, secondary authentication is successful at block 408. Otherwise, the user can initiate an alternative authentication procedure at block 409. For example, referring to FIG. 1, the user may contact a person associated with computer system 100 to verify the identity of the user through communication channel 155.

With some embodiments, an affirmer may provide challenge information comprising random text, random number, and/or OTP by texting, e-mailing, or calling via telephone the user independently of the operation of system 100. As an example, suppose that a user is assigned three affirmers: affirmer 1, affirmer 2, and affirmer 3 for an instance of authenticating. After each of the affirmers has successfully authenticated (typically through primary authentication using the affirmer's password), system 100 sends each of the affirmers different secondary authentication (challenge) information. Continuing the example, random eight-character strings "aDfg1*?x", "zp39M<+z", and ",wem1)c;" are sent to affirmer 1, affirmer 2, and affirmer 3, respectively, over secure channel 153 as shown in FIG. 1. Each affirmer then shares the secondary authentication information by sending e-mail to the user. When the user has received the secondary authentication information from all of the affirmers, the user sends the three shared eight-character strings to system 100 over communication channel 152. If system 100 determines that the user has provided the same eight-character strings previously sent to the affirmers, the user has successfully authenticated.

Several aspects address the Byzantine Generals problem. First, trusted contacts are uniformly selected for a user's contact list. Second, affirmers are further selected from a user's contact list in a random and dynamic manner (e.g., each time the user is authenticated). In addition, the user must provide information from all of the affirmers in order to successfully authenticate via the secondary authentication mechanism. Moreover, in a situation with common affirmers for many users, the load of affirmation may be evenly distributed so that a single affirmer does not become a single point of failure for many users in case of a compromise.

FIG. 5A-B shows instances for obtaining an affirmer list from a trusted contact list for a user in accordance with an aspect of the embodiments. Contact lists 501a,b are typically static for the user after the list has been configured during the enrollment phase. However, computer system 100 may periodically refresh list 501a,b so that the list is properly updated, where one or more previous trusted contacts are replaced.

At each instance of secondary authentication, computer system 100 obtains affirmer lists 502a,b. For example, computer device 201 constructs list 502a for a first instance of authentication by randomly selecting entries from list 501a using a random number generator. Computer device 201 then constructs list 502b that changes for subsequent instances. In other words, lists 502a,b are dynamic while lists 501a,b are typically static.

We will now see how the process of selecting r in random and requiring all of r values to be correctly entered by the user requiring authentication, reduces the probability of a compromised, authentication.

Let
n=number of trusted contacts (users) selected during enrollment
r=number of affirmers randomly selected for authentication
x=percentage of n that are compromised
nx=total of trusted users that are compromised
Consequently, $$P(c) = \text{Probability of a compromised authentication} \quad \text{(EQ. 1)}$$

$$P(c) = \frac{r \text{ users selected from set of } nx \text{ comprised users}}{r \text{ users selected from the list of } n \text{ users enrolled}} \quad \text{(EQ. 2)}$$

$$P(c) = \frac{nx_{C_r}}{n_{C_r}} = \frac{!nx}{!(nx-r)!r} \times \frac{!(n-r)!r}{!n} \quad \text{(EQ. 3)}$$

Assuming r=3 (that is system randomly selects 3 trusted contacts for authentication of a user), we get:

$$P(c) = \frac{!nx}{!(nx-3)!3} \times \frac{!(n-3)!3}{!n} = \quad (EQ.\ 4)$$

$$\frac{nx(nx-1)(nx-2)!(nx-3)}{!(nx-3)!3} \times \frac{!(n-3)!3}{n(n-1)(n-2)!(n-3)}$$

Hence, $$P(c) = \frac{nx(nx-1)(nx-2)}{n(n-1)(n-2)} \quad (EQ.\ 5)$$

The probability of compromised authentication may be determined for a scenario in which the user has initially selected 10 users (trusted contacts) during enrollment but during the authentication phase, 25% of the selected trusted contacts are compromised. That is, $$n=10,\ x=25\%,\ nx=2.5 \quad (EQ.\ 6)$$

The probability of compromising authentication in this scenario (where 1% is the targeted objective) is:

$$P(c) = \frac{2.5 \times 1.5 \times .5}{10 \times 9 \times 8} = \frac{1.875}{720} = .0026 \ll 1\% \quad (EQ.\ 7)$$

As n and r increase, the robustness of computer system 100 to prevent a compromised authentication (even when a substantial number of other trusted contacts are compromised) also increases, where the probability of a compromised authentication is inversely proportional to n and r and directly proportional to x.

To extend the above scenario, one can determine the probability of a compromised authentication (P(c)), when the percentage of compromised n trusted contacts increases from 25% to 33%. From EQ. 5, where r=3, n=10, and nx=3.3:

$$P(c) = \frac{3.3 \times 2.3 \times 1.3}{10 \times 9 \times 8} = \frac{9.867}{720} = .013704 = 1.37\% > 1\% \quad (EQ.\ 8)$$

Because P(c) approximately equals 1.37% and consequently exceeds the targeted objective of 1%, the value of r can be increased to 4 to provide additional robustness. Using EQ. 3, one can determine P(c), where n=10 and r=4:

$$P(c) = \frac{nx(nx-1)(nx-2)(nx-3)}{n(n-1)(n-2)(n-3)} \quad (EQ.\ 9)$$

With n=10 and nx=3.3, $$P(c) = \frac{3.3 \times 2.3 \times 1.3 \times .3}{10 \times 9 \times 8 \times 7} = \frac{2.9601}{5040} = .000587 = .06\% \ll 1\% \quad (EQ.\ 10)$$

By increasing r from 3 to 4, P(c) decreases to approximately 0.06%, which is within the targeted objective of 1%.

The above example illustrates that there may be a tradeoff between more robust authentication and the user's experience. For example, increasing r entails more interaction with affirmers, where the user receives a greater number of e-mails from all of the affirmers and enters more secondary authentication information in order to successfully complete secondary authentication.

Figure 6:
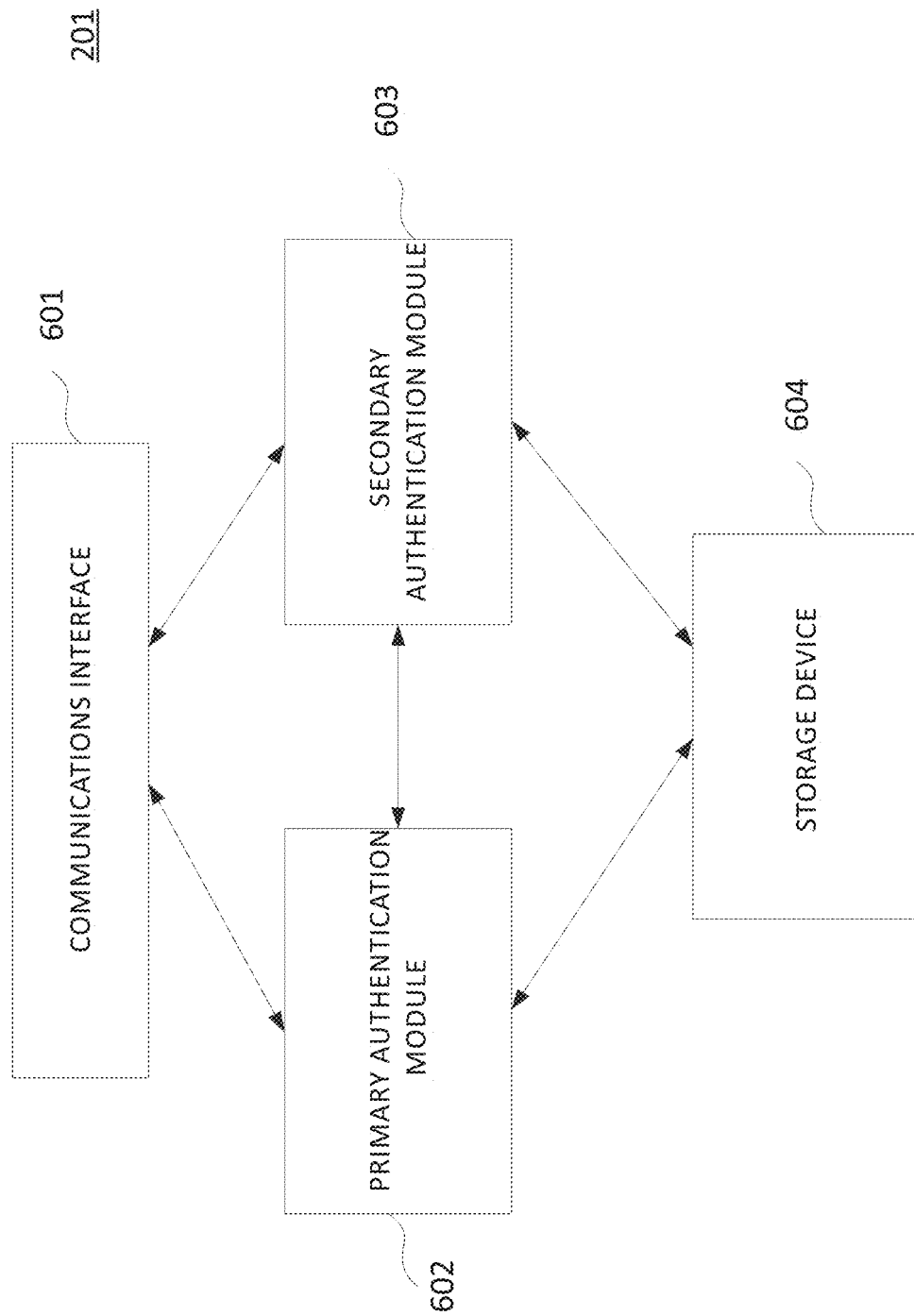
FIG. 6 shows a computing device that supports authentication in accordance with one or more illustrative aspects described herein.

FIG. 6 shows computing device 201 (shown in FIG. 2) that supports authentication in accordance with an aspect of the embodiments. Computing device 201 comprises communications interface 601, primary authentication module 602, secondary authentication module 603, and storage device 604.

In reference to FIG. 2, communications interface enables computing device 201 to receive and transmit messages to devices 261-265 via network 230.

Primary authentication module 602 enables computing device 201 to authenticate a user via a primary authentication mechanism (for example, entering the password). With some embodiments, if the user is unable to complete primary authentication (for example, the user forgot his/her password), computing device 201 may resort to secondary authentication if the user is registered for the secondary authentication feature. However, with some embodiments, computing device 201 may use secondary authentication rather primary authentication as the primary mechanism for authentication or may use both primary and secondary authentication to enhance the certainty of authentication.

If secondary authentication is invoked, secondary authentication module 603 randomly selects a subset of trusted contacts from the plurality of trusted contacts (denoted as r and n, respectively, as previously discussed) to form a plurality of affirmers for the user. However, with some embodiments, secondary authentication module 603 may select the affirmers in a different manner rather than randomly. For example, referring to FIG. 5A, secondary authentication module 603 may select the first r contacts from contact list 501a, the next r contacts the next time, and so forth. When reaching the end of contact list 501a, secondary authentication module 603 may wrap around to the beginning of list 501a.

When secondary authentication module 603 has selected the affirmers for secondary authentication, module 603 notifies each of the selected r users about affirming the user through a mobile app executing on the affirmer's wireless device. If an affirmer successfully authenticates in response to the notification, module 603 sends secondary authentication information (e.g., OTP or random string) to the affirmer. The affirmer then shares the secondary authentication information with the user via a communications means (not explicitly shown in FIGS. 1 and 6) that may be typically used between the affirmer and the user during regular communications.

When the user has obtained secondary authentication information from all of the affirmers (for example, the mobile app may indicate that this has occurred), the user may complete secondary authentication with module 603 by sending the secondary authentication information from all the affirmers to module 603. If module 603 determines that the received secondary authentication information matches the secondary authentication information sent to all of the affirmers, secondary authentication is successfully completed.

FIGS. 7-10 show exemplary screenshots that are displayed at devices of the user and affirmers as generated during process 400 shown in FIG. 4.

Figure 7:
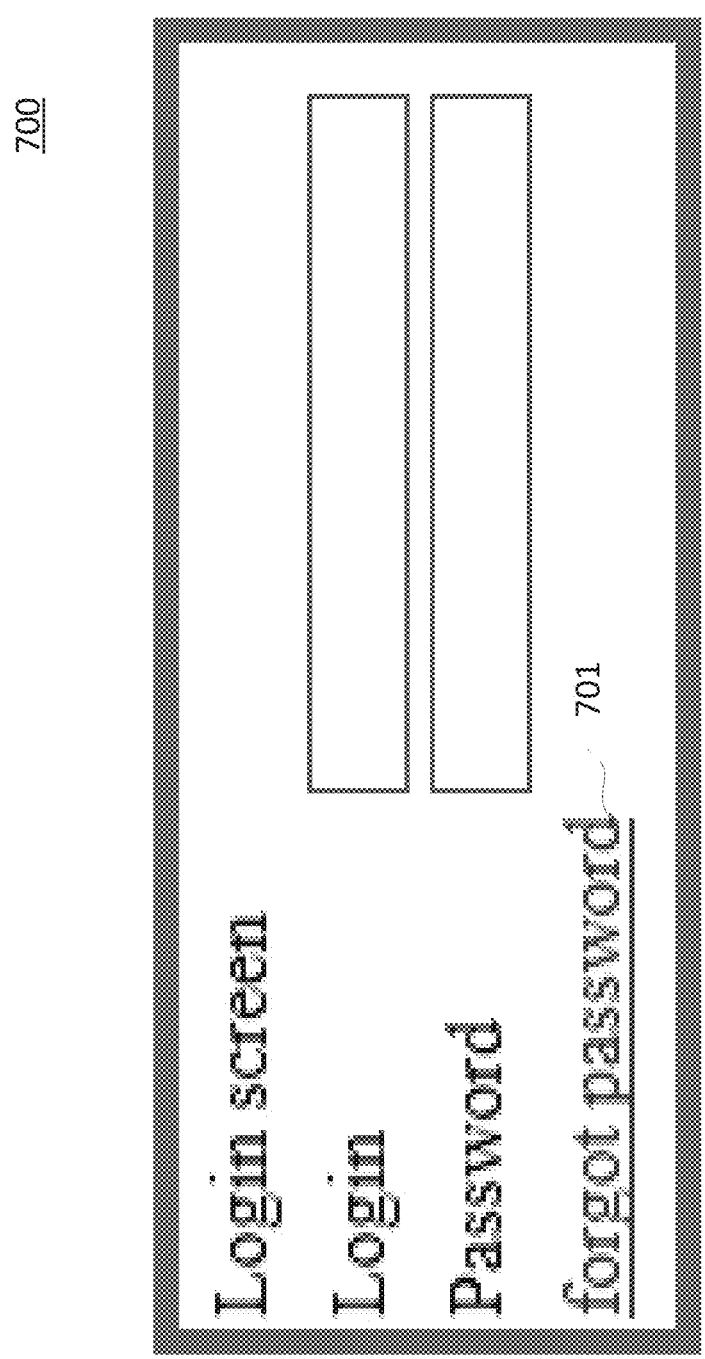
FIG. 7 shows a screenshot that may be displayed at a user's device in accordance with one or more illustrative aspects described herein.

FIG. 7 shows screenshot 700 that may be displayed at a user's device when the user is attempting to access computer system 100. If the user (customer) has forgotten his/her password and the user is registered for the secondary authentication feature, the user can select field 701 in order to initiate secondary authentication.

Figure 8:
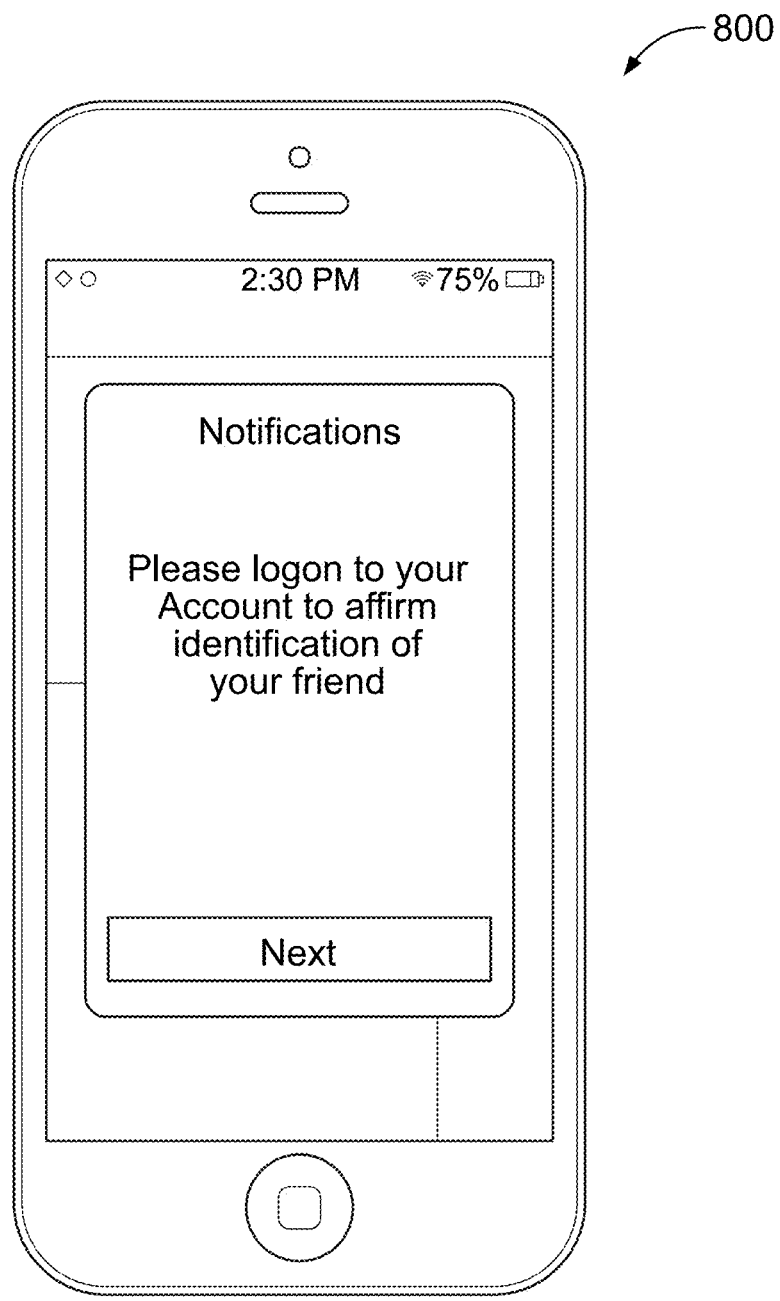
FIG. 8 shows a screenshot that may be displayed at an affirmer's device in accordance with one or more illustrative aspects described herein.

FIG. 8 shows a screenshot 800 that may be displayed at an affirmer's registered device when the user has initiated secondary authentication. In order for the affirmer to obtain challenge information, the affirmer logs into his/her account and authenticates via primary authentication in a similar manner as when the affirmer accesses his/her account in other situations.

FIG. 9 shows screenshot 900 that may be displayed at a user's device after secondary authentication information (which may be referred as verification codes) is presented to the affirmers. With the example shown in FIG. 9, there are three affirmers 901, 902, and 903. As previously discussed, the user obtains a verification code from each of the affirmers through communication channel 154 (as shown in FIG. 1), which may assume different forms and is often consistent with ways the user and affirmers typically communicate in other situations that are independent from system 100. For example, an affirmer may provide challenge information to the user via e-mail, texting, telephone call, and so forth.

Figure 10:
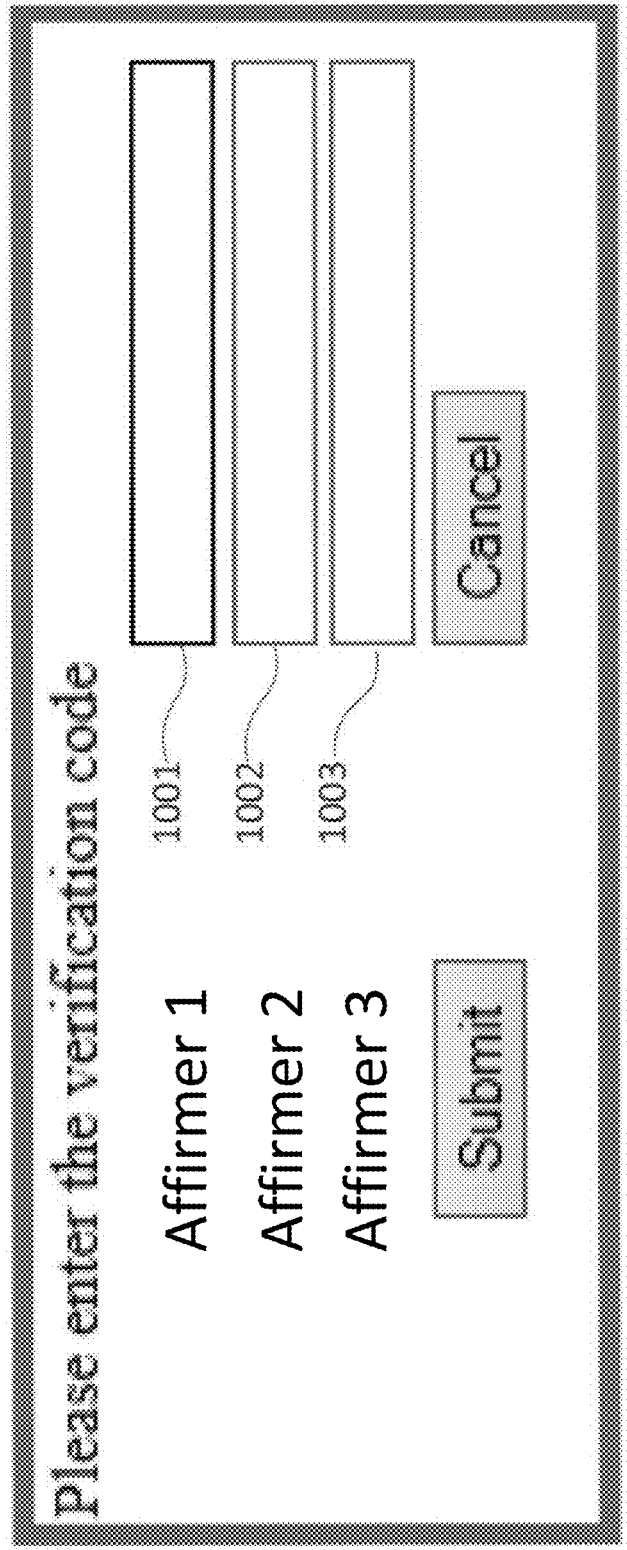
FIG. 10 shows a screenshot that may be displayed at a user's device in accordance with one or more illustrative aspects described herein.

FIG. 10 shows screenshot 1000 that may be displayed at a user's device when the user has obtained verification codes from the affirmers as indicated in screenshot 900. The user enters verification codes (secondary authentication information) 1001-1003 and then submits the information to computer system 100. If the submitted information matches what was previously presented to affirmers 901-903, the user has successfully completed secondary authentication.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

We claim:

1. An apparatus for supporting authentication of a first user on a computer system, the apparatus comprising:
   a primary authentication module;
   a secondary authentication module;
   a communications interface; and
   a storage device; and
   wherein:
   the primary authentication module is configured to:
   receive, through the communications interface, a first authentication request from the first user;
   when primary authentication cannot be completed, access, from the storage device, an authentication indicator indicative whether the first user is registered for a secondary authentication feature; and
   when the first user is registered for the secondary authentication feature, initiate secondary authentication of the first user; and
   the secondary authentication module is configured to:
   when initiated by the primary authentication module, access, from the storage device, authentication information about a plurality of trusted contacts for the first user;
   identify a minimum number of trusted contacts for a probability of compromising authentication not exceeding a targeted objective;
   select a first subset of trusted contacts from the plurality of trusted contacts to form a first plurality of affirmers for the first user, the first plurality of affirmers having the minimum number of trusted contacts;
   partition transmitted authentication information into a plurality of portions, wherein a number of portions in the plurality of portions equals the minimum number of trusted contacts;
   transmit, through the communications interface, only one of the plurality of portions of the transmitted authentication information to one of the first plurality of affirmers;
   repeat the transmitting to each affirmer of the first plurality of affirmers;
   subsequently receive, through the communications interface from the first user, an authentication response including received secondary authentication information from the first plurality of affirmers; and
   when the received secondary authentication information matches all portions of the plurality of portions, successfully authenticate the first user.

2. The apparatus of claim 1, wherein the secondary authentication module is configured to:
   randomly select the first subset of trusted contacts from the plurality of trusted contacts to form the first plurality of affirmers for the first user.

3. The apparatus of claim 1, wherein the secondary authentication module is configured to:
   when the apparatus receives, through the communications interface, a second authentication request from the first user, randomly select a second subset of trusted contacts from the plurality of trusted contacts to form a second plurality of affirmers for the first user, wherein the first subset is different from the second subset.

4. The apparatus of claim 1, wherein the secondary authentication module is configured to:
   when a first trusted contact from the first subset of trusted contacts does not accept being an affirmer, randomly select a second trusted contact from the plurality of trusted contacts for the first user.

5. The apparatus of claim 1, wherein the secondary authentication module is configured to:
   send the received secondary authentication information to a first affirmer only when the first affirmer has successfully authenticated.

6. The apparatus of claim 1, wherein the secondary authentication module is configured to:
   alter a first number of trusted contacts when forming the first plurality of affirmers for the first user.

7. The apparatus of claim 6, wherein the secondary authentication module is configured to:
   detect a detected number of attacks on the computer system; and
   change the first number of trusted contacts based on the detected number of attacks.

8. The apparatus of claim 6, wherein the first number of trusted contacts is different from a second number of trusted contacts when forming a second plurality of affirmers for a second user.

9. The apparatus of claim 8, wherein the secondary authentication module is configured to:
   obtain account information for the first and second users; and
   adjust the first and second numbers of trusted contacts based on the account information.

10. The apparatus of claim 1, wherein the received secondary authentication information comprises a random string.

11. The apparatus of claim 1, wherein each of the plurality of portions comprises a random character string and wherein the received secondary authentication information comprises a combination of the plurality of portions.

12. The apparatus of claim 1, wherein the secondary authentication module is configured to:
update a contact list containing the plurality of trusted contacts, wherein at least one trusted contact is different.

13. The apparatus of claim 1, wherein the secondary authentication module is configured to:
receive, through the communications interface, an enrollment request for secondary enrollment from the first user; and
select a predetermined number of contacts from a contact list of the first user to form the plurality of trusted contacts for the first user.

14. The apparatus of claim 13, wherein the secondary authentication module is configured to:
auto discover potential acquaintances of the first user;
send, through the communications interface, a notification to the first user, wherein the notification is indicative of possible trusted contacts;
receive, through the communication interface, a registration response including a selected subset of the possible trusted contacts; and
storing, at the storage device, the plurality of trusted contacts based on the selected subset of the possible trusted contacts.

15. The apparatus of claim 14, wherein the secondary authentication module is configured to:
obtain members from a social media profile of the first user; and
match the members with a list of known users.

16. A computer-assisted method comprising:
receiving, by a computer system, an authentication request from a user;
in response to determining that a primary authentication cannot be completed and the user is registered for a secondary authentication feature, initiating, by the computer system, secondary authentication of the user;
accessing authentication information about a plurality of trusted contacts for the user;
identifying a minimum number of trusted contacts for a probability of compromising authentication not exceeding a targeted objective;
randomly selecting a subset of trusted contacts from the plurality of trusted contacts to form a plurality of affirmers for the user, the plurality of affirmers having the minimum number of trusted contacts;
partitioning transmitted authentication information into a plurality of portions, wherein a number of portions in the plurality of portions equals the minimum number of trusted contacts;
transmitting only one of the plurality of portions of the transmitted authentication information to one of the plurality of affirmers;
repeating the transmitting to each affirmer of the plurality of affirmers;
in response to the transmitting, receiving, from the user, an authentication response including received secondary authentication information from the plurality of affirmers; and
when the received secondary authentication information matches all portions of the plurality of portions, successfully authenticating the user.

17. The method of claim 16, wherein each of the plurality of portions comprises a random character string and wherein the received secondary authentication information comprises a concatenation of the plurality of portions.

18. A method of claim 16 further comprising:
detecting a detected number of attacks on the computer system; and
changing a number of trust contacts contained in the subset.

19. The method of claim 16, further comprising:
obtaining account information for the user;
extracting at least one characteristics from the account information of the user; and
dynamically varying the minimum number of trusted contacts based on a change of the at least one characteristic.

20. One or more non-transitory computer-readable storage media storing computer executable instructions that, when executed, cause a computing device at least to:
receive an authentication request from a user;
initiate secondary authentication, in response to determining that a primary authentication cannot be completed and the user is enrolled for a secondary authentication feature;
access authentication information about a plurality of trusted contacts for the user;
identify a minimum number of trusted contacts for a probability of compromising authentication not exceeding a targeted objective;
select a subset of trusted contacts from the plurality of trusted contacts to form a plurality of affirmers for the user, the plurality of affirmers having the minimum number of trusted contacts;
partition transmitted authentication information into a plurality of portions, wherein a number of portions in the plurality of portions equals the minimum number of trusted contacts;
transmit only one of the plurality of portions of the transmitted authentication information to one of the plurality of affirmers;
repeat the transmitting to each affirmer of the plurality of affirmers;
in response to the transmitting, receive, from the user, an authentication response including received secondary authentication information from the plurality of affirmers; and
when the received secondary authentication information matches all portions of the plurality of portions, successfully authenticate the user.

21. The one or more non-transitory computer-readable storage media of claim 20, wherein the computer-executed instructions that, when executed, further cause the computing device to:
receive an enrollment request for secondary authentication enrollment from the user;
select a predetermined number of contacts to form the plurality of trusted contacts for the user; and
register the user in a secondary authentication feature.

* * * * *

UNITED STATES PATENT AND TRADEMARK OFFICE
CERTIFICATE OF CORRECTION

PATENT NO. : 10,783,231 B2  
APPLICATION NO. : 16/295157  
DATED : September 22, 2020  
INVENTOR(S) : Chakraborty et al.

Page 1 of 1

It is certified that error appears in the above-identified patent and that said Letters Patent is hereby corrected as shown below:

In the Claims

Column 14, Line 8:
In Claim 18, delete "A" and insert --The--

Column 14, Line 21:
In Claim 20, delete "computer executable" and insert --computer-executable--

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*